(12) United States Patent     (10) Patent No.: US 11,376,689 B2
Rudolf     (45) Date of Patent: Jul. 5, 2022

(54) BEAM FORMING LENS SYSTEM FOR LASER CUTTING, AND APPARATUS COMPRISING SAME

(71) Applicant: PRECITEC GMBH & CO. KG, Gaggenau (DE)

(72) Inventor: Andreas Rudolf, Kuppenheim (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 572 days.

(21) Appl. No.: 16/096,269

(22) PCT Filed: Apr. 25, 2017

(86) PCT No.: PCT/EP2017/059730
§ 371 (c)(1),
(2) Date: Oct. 24, 2018

(87) PCT Pub. No.: WO2017/186681
PCT Pub. Date: Feb. 11, 2017

(65) Prior Publication Data
US 2020/0198054 A1 Jun. 25, 2020

(30) Foreign Application Priority Data
Apr. 25, 2016 (DE) .................... 10 2016 107 595.7

(51) Int. Cl.
*B23K 26/06* (2014.01)
*B23K 26/073* (2006.01)
(Continued)

(52) U.S. Cl.
CPC ...... *B23K 26/0648* (2013.01); *B23K 26/0734* (2013.01); *B23K 26/38* (2013.01); *G02B 3/0006* (2013.01); *G02B 5/001* (2013.01)

(58) Field of Classification Search
CPC .. G02B 5/001; G02B 3/0006; B23K 26/0648; B23K 26/0734; B23K 26/0652; B23K 26/38
(Continued)

(56) References Cited

U.S. PATENT DOCUMENTS 4,380,365 A * 4/1983 Gross ...................... G02B 6/25
                                                385/33
5,101,457 A * 3/1992 Blonder ................. C03C 25/68
                                                385/33
(Continued)

FOREIGN PATENT DOCUMENTS

CN         1781645 A     6/2006
CN       202041723 U     11/2011
(Continued)

OTHER PUBLICATIONS

PCT International Search Report, PCT/EP2017/059730, dated Jul. 17, 2017, 6 Pages.

*Primary Examiner* — Eric S Stapleton
(74) *Attorney, Agent, or Firm* — Fenwick & West LLP (57) ABSTRACT

The invention relates to a beam forming lens system for machining material using a laser beam, comprising a two-dimensional axicon array (10) featuring a plurality of microaxicons (11) for creating an annular laser beam intensity profile, the microaxicons (11) being provided with curved lateral surfaces (113). The invention also relates to an apparatus for machining material using a laser beam, comprising a beam forming lens system of said type and a focusing lens system (15) for focusing the laser beam onto a workpiece (18). The beam forming lens system is designed to create the annular laser beam intensity profile in a focal plane (F) of the focusing lens system (15).

12 Claims, 8 Drawing Sheets

(51) Int. Cl.
*B23K 26/38* (2014.01)
*G02B 3/00* (2006.01)
*G02B 5/00* (2006.01)

(58) Field of Classification Search
USPC ........................................................ 219/121.6
See application file for complete search history.

(56) References Cited

U.S. PATENT DOCUMENTS

| | | | | |
|---|---|---|---|---|
| 5,416,582 | A * | 5/1995 | Knutson | G01N 21/4795 356/484 |
| 5,551,968 | A * | 9/1996 | Pan | G02B 6/245 264/1.24 |
| 5,563,969 | A * | 10/1996 | Honmou | G02B 6/2552 385/33 |
| 5,583,342 | A * | 12/1996 | Ichie | G02B 5/001 250/458.1 |
| 6,054,717 | A * | 4/2000 | Perchak | B23Q 17/24 250/216 |
| 6,210,401 | B1 * | 4/2001 | Lai | H01S 3/235 606/12 |
| 6,326,998 | B1 * | 12/2001 | Palum | G02B 27/46 348/342 |
| 6,683,691 | B2 * | 1/2004 | Grunwald | G01J 11/00 356/450 |
| 6,706,036 | B2 * | 3/2004 | Lai | B23K 26/032 606/12 |
| 6,814,901 | B2 * | 11/2004 | Itoh | B29D 11/00375 156/99 |
| 6,982,790 | B1 * | 1/2006 | Gershenson | G01N 21/4795 250/227.19 |
| 7,099,535 | B2 * | 8/2006 | Bhagavatula | G02B 6/2552 385/124 |
| 7,220,255 | B2 * | 5/2007 | Lai | G02F 1/37 606/12 |
| 7,944,624 | B2 * | 5/2011 | Scaggs | G02B 5/001 359/741 |
| 8,325,417 | B1 * | 12/2012 | Kurti | G02B 27/28 359/483.01 |
| 8,554,087 | B2 * | 10/2013 | Osterberg | A61B 5/0059 398/199 |
| 8,724,219 | B1 * | 5/2014 | Wardlaw | G02B 19/0052 359/483.01 |
| 9,220,412 | B2 * | 12/2015 | Cuccia | A61B 5/0059 |
| 9,821,522 | B2 * | 11/2017 | Le | B29D 11/0074 |
| 10,420,546 | B2 * | 9/2019 | Gross | A61B 17/06166 |
| 10,827,915 | B2 * | 11/2020 | Roichman | A61B 1/0005 |
| 2001/0010003 | A1 * | 7/2001 | Lai | B23K 26/0096 606/107 |
| 2004/0199150 | A1 * | 10/2004 | Lai | G02F 1/37 606/5 |
| 2005/0187478 | A1 * | 8/2005 | Beaudry | A61B 5/0091 600/476 |
| 2005/0200960 | A1 * | 9/2005 | Tang | G02B 3/0012 359/619 |
| 2005/0211885 | A1 * | 9/2005 | Tobiason | G01D 5/34723 250/231.13 |
| 2006/0217688 | A1 * | 9/2006 | Lai | B23K 26/032 606/4 |
| 2007/0177116 | A1 * | 8/2007 | Amako | G03B 21/625 355/53 |
| 2007/0177166 | A1 * | 8/2007 | Habets | G06T 7/62 358/1.2 |
| 2008/0019639 | A1 * | 1/2008 | Donlagic | G02B 6/262 385/35 |
| 2009/0059394 | A1 * | 3/2009 | Scaggs | G02B 19/0052 359/741 |
| 2011/0205352 | A1 * | 8/2011 | Pavani | G02B 30/36 348/80 |
| 2012/0081518 | A1 * | 4/2012 | Liu | G02B 21/006 348/46 |
| 2013/0180966 | A1 * | 7/2013 | Gross | B23K 26/361 219/121.69 |
| 2013/0238022 | A1 * | 9/2013 | Gross | B23K 26/361 606/228 |
| 2013/0272653 | A1 * | 10/2013 | Le | B29D 11/0074 385/33 |
| 2014/0009816 | A1 * | 1/2014 | Ma | G02B 26/001 359/292 |
| 2014/0126061 | A1 * | 5/2014 | Wallrabe | G02B 5/10 359/572 |
| 2014/0285653 | A1 * | 9/2014 | Betzig | G02B 21/002 348/80 |
| 2017/0189016 | A1 * | 7/2017 | Gross | B23K 26/083 |

FOREIGN PATENT DOCUMENTS

| | | |
|---|---|---|
| CN | 103292743 A | 9/2013 |
| DE | 28 21 883 C2 | 10/1979 |
| DE | 10 2005 059755 B3 | 6/2007 |
| DE | 10 2012 219 074 A1 | 4/2014 |
| DE | 10 2013 102 442 A1 | 9/2014 |
| EP | 0005460 A1 | 11/1979 |
| EP | 2 334 465 | 3/2015 |
| JP | 2006-142335 A | 6/2006 |
| WO | WO 2016/010954 A2 | 1/2016 |
| WO | WO 2017/186681 A1 | 11/2017 |

* cited by examiner

| z-position | With curvature | Without curvature |
|---|---|---|
| -10 mm |  |  |
| -5 mm |  |  |
| 0 mm (focal point) |  |  |
| 5 mm |  |  |
| 10 mm |  |  |

|  | Axicon array without curved surface areas | Axicon array with curved surface areas |
|---|---|---|
| Axicon surface profile (not true-to-scale) |  |  |
| ZEMAX - Coeff 1 r^1 | -4.5E-3 / mm | -2.0E-3 / mm |
| ZEMAX - Coeff 1 r^2 | 0 / mm^2 | -3.5E-3 / mm^2 |
| Rayleigh length | 3,4 mm | 9,4 mm |

BEAM FORMING LENS SYSTEM FOR LASER CUTTING, AND APPARATUS COMPRISING SAME

The invention pertains to a beam forming lens system for machining material using a laser beam, preferably for laser cutting, as well as to an apparatus for machining material using a laser beam, which comprises at least one such beam forming lens system.

In material machining by means of a laser beam such as laser welding or laser cutting, the laser beam emitted by a laser light source, e.g. the end of an optical fiber, is focused on the workpiece to be machined with the aid of a beam guiding and focusing lens system. In this case, the diameter of the focal point, i.e. the diameter of the image of the laser light source on the workpiece, results from the optical data of the individual optical elements of the beam guiding and focusing lens system. When using a standard laser machining head with a collimator lens system and a focusing lens system, in which the laser light is supplied via an optical fiber, the focal point diameter results from the product of the fiber core diameter and the focusing focal length divided by the collimation focal length. For laser cutting processes, different focal point diameters, i.e. laser beam diameters in the focal point, are required—depending on the sheet metal thickness. In this context, the laser beam diameter should increase proportionally with the thickness of the material to be cut. For example, a focal point diameter of about 125 μm is used for sheet metal thicknesses up to 5 mm whereas a focal point diameter that is twice as large, i.e. a focal point diameter of about 250 μm, is desired for cutting metal sheets with a thickness between 5 mm and 10 mm. Starting at sheet metal thicknesses of 10 mm, the guiding and focusing lens systems used delivers a focal point diameter of about 600 μm.

In large focal point diameters, it is advantageous to realize an annular profile of the intensity distribution in the focal point because a more homogenous temperature distribution in the kerf is thereby achieved. As a result, the molten material can be expelled more efficiently by the cutting gas.

A conventional laser machining head can project with a fixed or variable reproduction ratio between 1:1 and 1:3 and create focal point diameters between 100 μm and 1500 μm. For example, laser machining heads for cutting thin and thick metal sheets with a high cutting edge quality require an option for adjusting a respectively optimal laser power density distribution on the workpiece, e.g. for creating an annular intensity distribution in the focal plane.

Beam forming lens systems are used for this purpose. A beam forming lens system refers to a lens system or multiple lens systems for respectively changing an intensity distribution or a shape of the laser beam. For example, beam forming lens systems can create flattened and/or annular intensity profiles in the focal plane. A beam forming lens system may comprise, for example, one or more diffractive or refractive optical elements. The advantages of refractive optical elements can be seen in that they have a high transmission efficiency, are suitable for permanent use in high-power laser systems and not dependent on the wavelength.

An apparatus for machining material, e.g. for drilling, punching and welding processes, with the aid of laser beams is already known from DE 28 21 883 C2, wherein a cone consisting of transparent refractive material (axicon) is arranged between a collimator lens system for widening the laser beam and a focusing lens system for focusing the laser beam on a workpiece in order to achieve an axially symmetrical inversion of the axially near and axially distant cross-sectional areas of the laser machining beam. The focusing lens system then focuses the laser machining beam in an annular region on the work piece in accordance with its changed beam characteristic. Due to the use of the axicon, the intensity distribution in the laser machining beam is therefore changed in such a way that an annular profile results in the region of the focal point.

The invention is based on the objective of making available a beam forming lens system for machining material using a laser beam (particularly for laser cutting), as well as an apparatus for machining material using a laser beam with such a beam forming lens system, wherein an annular intensity profile with enhanced homogeneity and increased Rayleigh length can be respectively achieved with said beam forming lens system and said apparatus.

According to the invention, this objective is attained with a beam forming lens system for machining material using a laser beam according to claim 1, as well as an apparatus for machining material using a laser beam with such a beam forming lens system. Advantageous embodiments and enhancements of the invention are described in the dependent claims.

An inventive beam forming lens system for machining material using a laser beam, particularly for laser cutting, comprises an axicon array with a plurality of microaxicons for creating a flattened and/or annular intensity profile of the laser beam, e.g. in a focal plane of an upstream or downstream focusing lens system. The homogeneity of the annular intensity profile can be improved and a high lateral positioning tolerance can be provided due to the two-dimensional array. The axicon array may be realized in the form of a refractive optical element. In other words, the structure sizes of the axicon array may be significantly larger than the wavelength of the laser beam. In this case, the light deflection as a result of diffraction is negligible.

A thickness of the annular profile, the ring diameter, the central extinction, etc., can be varied in dependence on the shape of the microaxicons or axicon units of the axicon array, e.g. their height, axicon angle, diameter, surface curvature of their lateral surfaces or surface areas and the like.

The lateral surface or surface area, i.e. the cone-like surface, of each microaxicon is preferably curved or arched such that a dome-like shape is created. In this context, "curved" respectively refers to a curvature along an optical axis of the beam shaping lens system or in a direction perpendicular to the plane, in which the two-dimensional axicon array extends, or parallel to a vertical from the apex of the microaxicon to its base area. The lateral surfaces or surface areas of the microaxicons may be curved aspherically. An attainable Rayleigh length of the laser beam can be increased due to the curved lateral surfaces of the microaxicons. In this context, the Rayleigh length refers to a length along the optical axis, which a laser beam requires for cutting its maximum intensity in half starting from the beam waist. The focal depth can therefore be enhanced. In this way, the ring thickness of the intensity profile in the focal plane can be simultaneously increased and the peak or maximum intensity can thereby be lowered. This results in a more homogenous maximum intensity in the axial direction.

In addition, apices of the microaxicons and/or valleys between the microaxicons may be rounded. This not only allows a simplified manufacture, but also a purposeful light distribution into the center of the intensity distribution such that an intensity greater than zero can be achieved in the center of the annular distribution.

The microaxicons may be respectively arranged in the axicon array in a grid-like or regular manner. The microaxicons are preferably arranged in a hexagonal pattern or grid. In this way, an optimal space factor can be achieved and a homogeneity of the intensity distribution along the annular profile can be maximized.

In another preferred exemplary embodiment, the axicon array may contain microaxicons that differ with respect to their shape. For example, the axicon array may contain microaxicons with straight and curved lateral surfaces. The microaxicons may also have different axicon angles and/or curvatures of the lateral surfaces and/or heights and/or diameters and/or shapes of the base area and/or sizes of the base area. In this context, "height" refers to the vertical from the apex of the microaxicons to its base area, which lies in the plane of the (essentially) two-dimensional axicon array. Distances between the microaxicons may be irregular if they respectively have different base areas or diameters. The axicon array may also contain microaxicons that are asymmetric within themselves, for example, with respect to the curvature of their lateral surface and/or the arrangement of the apex of the microaxicon relative to the base area, e.g. in the form of a decentralized arrangement of the apex above the base area. Different beam formations can be superimposed and/or more homogenous intensity distributions can be achieved with differently shaped microaxicons in the axicon array. It is therefore possible to create beam profiles, which could not be created with an axicon array consisting of identically shaped microaxicons.

The axicon array may consist of a plurality of microaxicons, which are arranged in a substrate plane of the axicon array perpendicular to the optical axis of the beam forming lens system. The microaxicons are preferably spaced apart from one another by a distance that is smaller than the beam diameter of a preferably collimated laser beam incident on the axicon array. In this way, the laser beam can pass through multiple microaxicons. A homogenized beam profile can be created without loss of beam energy by respectively superimposing the partial laser beams (so-called beamlets) passing through the individual microaxicons in the focal plane or on the workpiece.

The laser beam may be a multi-modal laser beam such that self-interference is reduced in comparison with single-mode lasers and a greater focal point diameter can be achieved.

Furthermore, an inventive apparatus for machining material using a laser beam comprises at least one beam forming lens system according to one of the described exemplary embodiments and a focusing lens system for focusing a laser beam on a workpiece.

The beam forming lens system is preferably arranged in a beam path of the apparatus upstream of the focusing lens system, for example a focusing lens.

The apparatus may also comprise a collimator lens system for widening the laser beam. The beam forming lens system is preferably arranged in the collimated laser beam, but it would basically also possible to arrange the inventive beam forming lens system in the divergent or convergent region of the laser beam. It is particularly preferred to arrange the beam forming lens system between a collimator lens system for widening the laser beam and the focusing lens system.

The apparatus may furthermore comprise at least one lens with variable focal length for varying the ring diameter of the intensity profile in the focal plane. The variable focal length can be achieved, for example, by displacing one or more lenses along the optical axis. Alternatively, liquid lenses or polymer lenses may also be used.

The apparatus for machining material using a laser beam preferably comprises a laser cutting head or laser machining head.

The invention is described in greater detail below with reference to exemplary embodiments illustrated in the drawings. In these drawings:

FIG. 7 shows a beam guiding and focusing lens system of the type used in a laser machining head for laser machining processes with an inventive axicon array, wherein

In the figures, corresponding components are identified by the same reference symbols.

Figure 1:
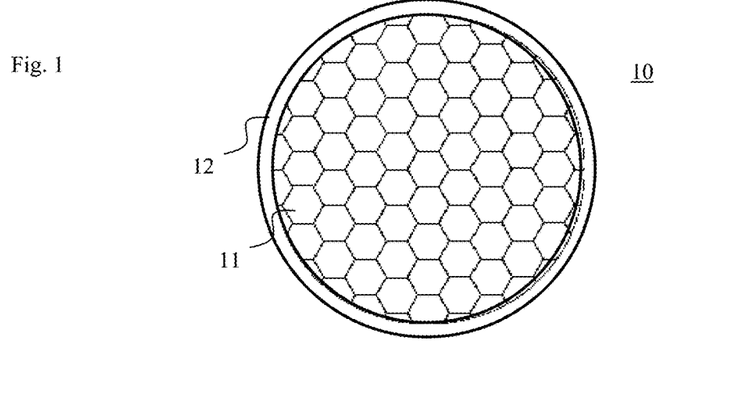
FIG. 1 shows a schematic top view of an axicon array.

FIG. 1 shows a schematic top view of an axicon array 10 with a plurality of microaxicons 11 for a beam forming lens system for creating an annular intensity profile. The microaxicons 11 are preferably arranged on a surface or substrate plane 12 of the axicon array 10 in the form of a regular structure. In the example illustrated in FIG. 1, the microaxicons 11 are arranged in a hexagonal grid or pattern. An optimal space factor can be achieved by arranging the microaxicons 11 in a hexagonal pattern. The circumference of the axicon array 10 may naturally also have shapes other than circular, e.g. rectangular, oval, etc. In this context, the circumference of the axicon array 10 refers to an edge of the axicon array 10 in a plane of the two-dimensional array of microaxicons 11. In other words, the circumference of the axicon array 10 refers to an edge of the axicon array 10 in a plane perpendicular to the optical axis of the axicon array 10. The axicon array 10 preferably has a substrate plane 12 with a diameter between 10 and 50 mm or, if the substrate plane has a rectangular or square shape, with an edge length, e.g., of up to 100 mm. For example, the axicon array 10 may be made of quartz glass, sapphire or ZnSe.

Figure 2A:
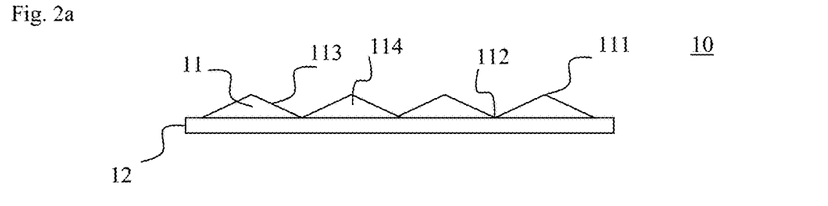
FIG. 2a shows a schematic side view of an axicon array comprising axicon units without curved lateral surfaces.
Figure 2B:
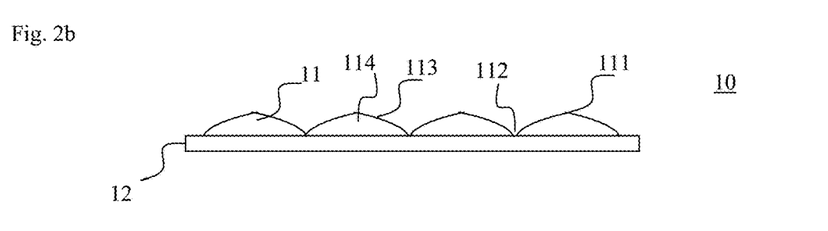
FIG. 2b shows a schematic side view of an inventive axicon array comprising axicon units with curved lateral surfaces.

Each microaxicon 11 has a cone-like structure with an apex 111 and a surface area or a lateral surface 113 (see FIGS. 2a and 2b). Valleys 112 are formed in the axicon array 10 between adjacent microaxicons 11. The length of a vertical from the apex 111 to a base area of the microaxicon 11, which lies in the substrate plane 12, is referred to as height. In the following description, a diameter or a circumference of the microaxicon 11 respectively refers to the diameter or the circumference of the base area of the microaxicon 11. An aperture angle formed by the lateral surface 113 at the apex 111 of the microaxicon 11 is referred to as axicon angle 114.

FIG. 2a shows a side view of an axicon array that comprises a plurality of microaxicons 11 with straight lateral surfaces or surface areas. In this case, the side view of a microaxicon 11 corresponds to an isosceles triangle with a straight surface area or lateral surface 113.

FIG. 2b shows a preferred embodiment of an axicon array 10, which comprises a plurality of microaxicons 11 with curved lateral surfaces 113 such that a dome-like structure is created in a side view. In this case, the lateral surfaces 113 of the microaxicons 11 may be shaped aspherically. In addition, the apices 111 of the microaxicons 11 and/or the valleys 112 between the microaxicons 11 may be rounded such that the manufacture of the axicon array 10 is simplified and a light distribution into the center of the annular intensity distribution can also be realized. The microaxicons 11 are preferably arranged in the axicon array regularly, i.e. in the form of a grid or pattern structure as described above with reference to FIG. 1.

In another preferred exemplary embodiment, the microaxicons 11 are not shaped uniformly, but rather may differ with respect to at least one of the parameters height, diameter, axicon angle, curvature of the lateral surface, size and/or shape of the base area, etc. A microaxicon 11 may also be shaped asymmetrically within itself. For example, the apex 111 may not be arranged centrally above the base area of a microaxicon 11 such that the resulting distances from the apex 111 to the circumference of the microaxicon 11 differ. In another example, the curvature of the lateral surface 113 of a microaxicon may vary, e.g., such that one region of the lateral surface 113 is curved more significantly than an opposite region referred to a vertical from the apex 111. The axicon array 10 can therefore consist of differently shaped microaxicons 11. For example, the axicon array 10 may contain microaxicons 11 with curved lateral surfaces 113 (see FIG. 2b) and with straight lateral surfaces 113 (see FIG. 2a). The differently shaped microaxicons 11 may be arranged irregularly or regularly. In this respect, different base areas or diameters can be compensated with valleys that have different shapes. Differently shaped microaxicons 11 in the axicon unit result in a superposition of different beam formations such that it is possible to create beam profiles, which could not be created with an axicon array 10 comprising identically shaped microaxicons 11.

The microaxicons 11 may have a size between 0.5 and 5 mm. The axicon angle 114 (also referred to as aperture angle or apex angle) can be chosen in dependence on the desired ring diameter and preferably lies between 0.1° and 1°. In microaxicons 11 with curved lateral surfaces 113, the axicon angle 114 is defined by tangents on the lateral surfaces 113 near the apex 111. The microaxicons 11 ideally are tightly packed in the axicon array 10, i.e. without clearance between adjacent microaxicons 11. With respect to the manufacturing technology, however, it is advantageous to allow certain rounding of the valleys between adjacent microaxicons 11 such that the clearance is effectively greater than 0 mm, but still amounts to significantly less than 1 mm.

Figure 3:
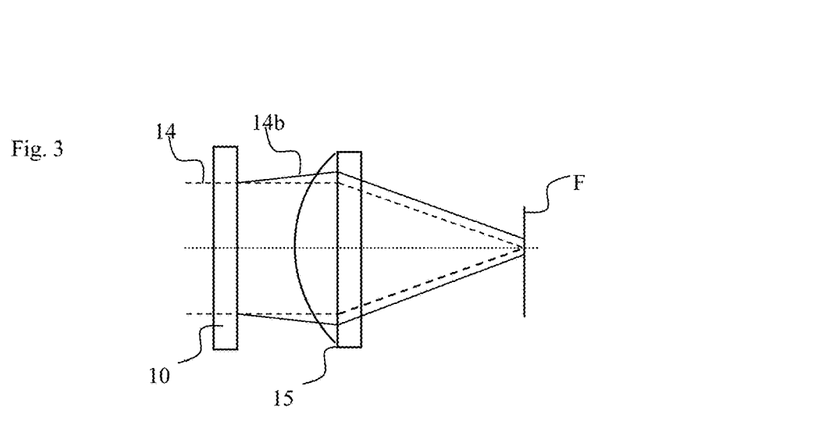
FIG. 3 shows a schematic representation of an inventive axicon array in a collimated laser beam with a downstream focusing lens system for focusing the laser beam.

FIG. 3 shows an exemplary arrangement of the axicon array 10 in the beam path of a laser, for example a fiber laser, disk laser or diode laser, with a downstream focusing lens 15. A collimated laser beam 14 is widened after passing through the axicon array 10 and subsequently projected in the focal plane F of the focusing lens in the form of an annular beam profile by the focusing lens 15. In this case, the attained ring diameter may lie between 500 and 1500 µm and the ring thicknesses may lie between 300 and 1,000 µm. In FIG. 3, the formed laser beam 14b is drawn with a broken line whereas the beam path of a normal collimated laser beam 14 (without axicon array) is drawn with a continuous line. The axicon array 10 with n microaxicons 11 divides the laser beam 14 into n partial beams or beamlets. The downstream focusing lens superimposes the n beamlets in the focal plane F of the focusing lens 15 such that they create a homogenous annular intensity profile (see FIGS. 6a and 6b).

Figure 4A:
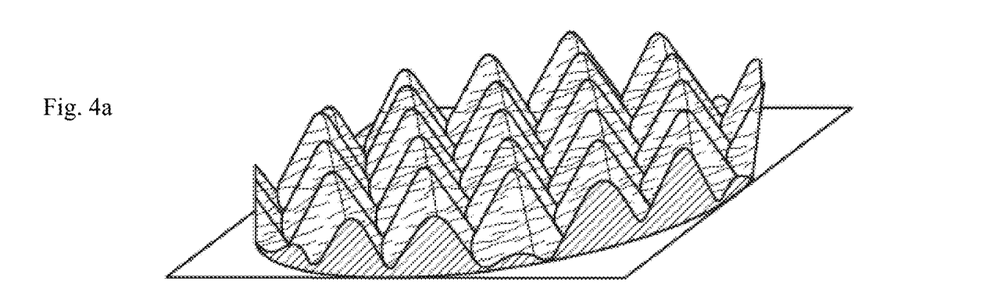
FIG. 4a shows a schematic representation of a three-dimensional surface profile of an inventive axicon array.
Figure 4B:
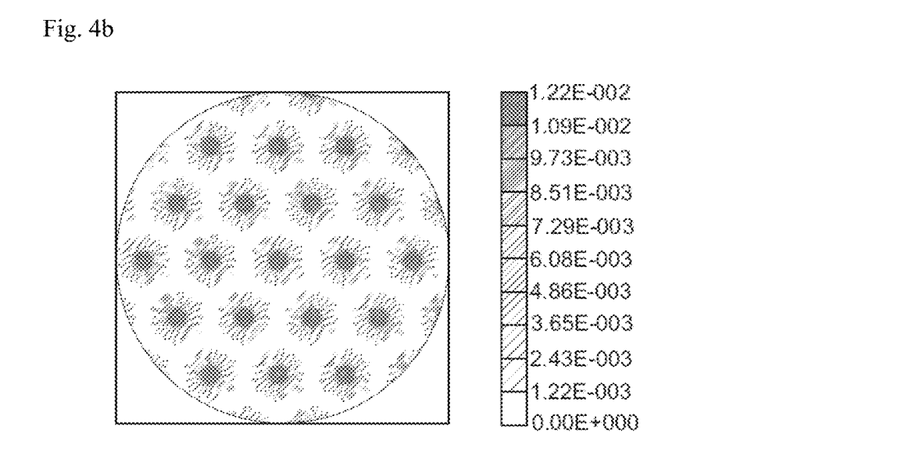
FIG. 4b shows a schematic representation of a two-dimensional surface profile of an inventive axicon array.

FIG. 4a shows a perspective view of a three-dimensional surface profile of the axicon array 10 (not true-to-scale). FIG. 4b shows a two-dimensional surface profile of the axicon array 10. The numerical data refers to the contour height in mm.

Figure 5:
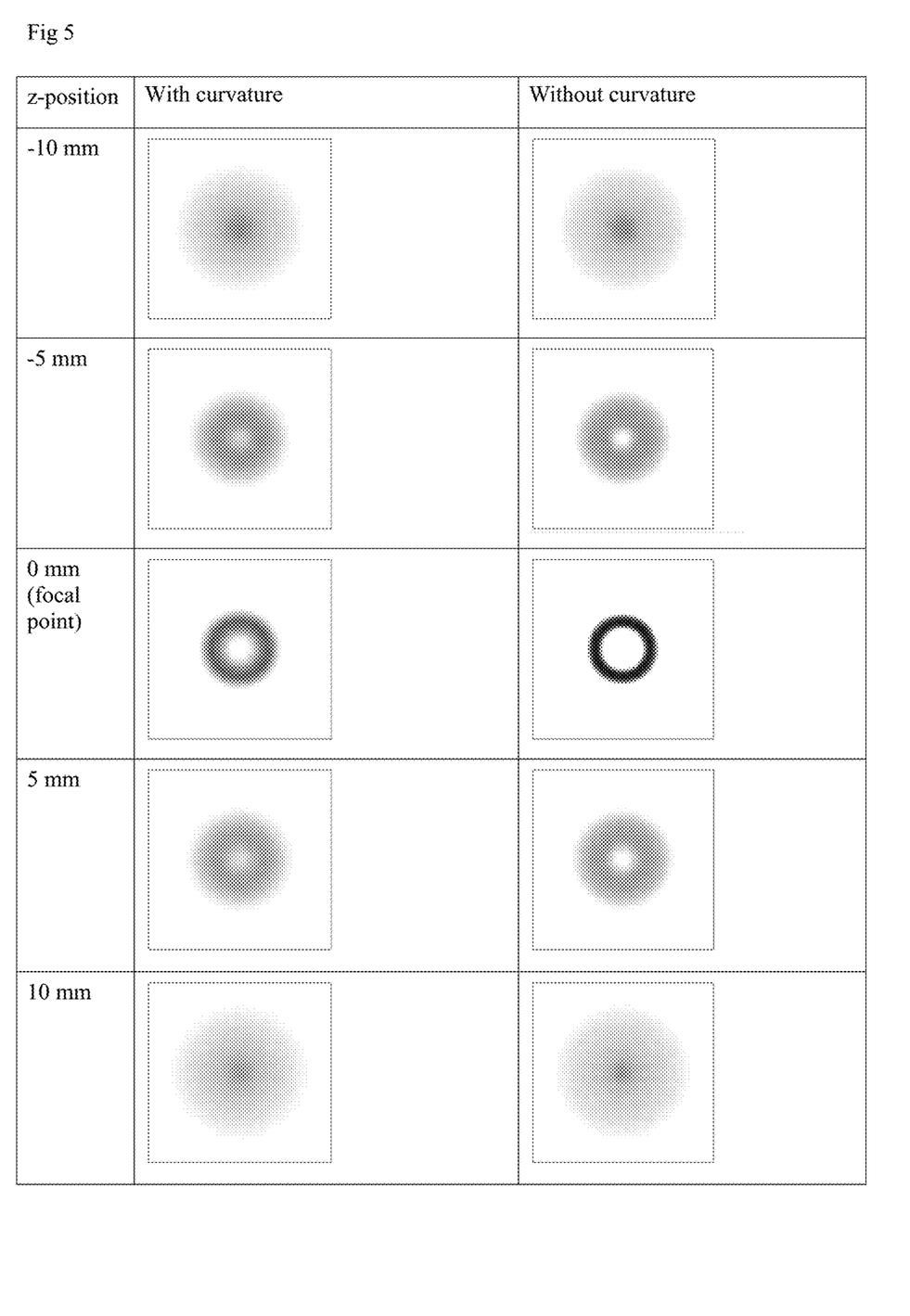
FIG. 5 shows caustic surfaces of an axicon array comprising axicon units without curved lateral surfaces, as well as an inventive axicon array comprising axicon units with curved lateral surfaces.

FIG. 5 shows caustic surfaces (image sections 1.5 mm×1.5 mm) of an axicon array that respectively comprises axicon units, i.e. microaxicons, with curved lateral surfaces and without curved lateral surfaces in different z-positions, i.e. along the optical axis. The scaling of the gray levels corresponds to the scale from low intensity (lower end of the scale) to high intensity (upper end of the scale) in any unit, e.g. W/cm², and may be identical to that shown in FIGS. 6a and 6b. The Rayleigh length of a laser beam passing through the axicon array 10 is increased due to the arched lateral surfaces 113 of the microaxicons 11. In this case, the ring thickness in the focal plane of the resulting annular intensity profile is also increased and the peak intensity is therefore lowered. The curvature or arc has little effect outside the focal plane (see FIG. 5). It can also be gathered that the annular intensity profile primarily exists in the focal point (z=0) and has a high homogeneity.

Figure 8:
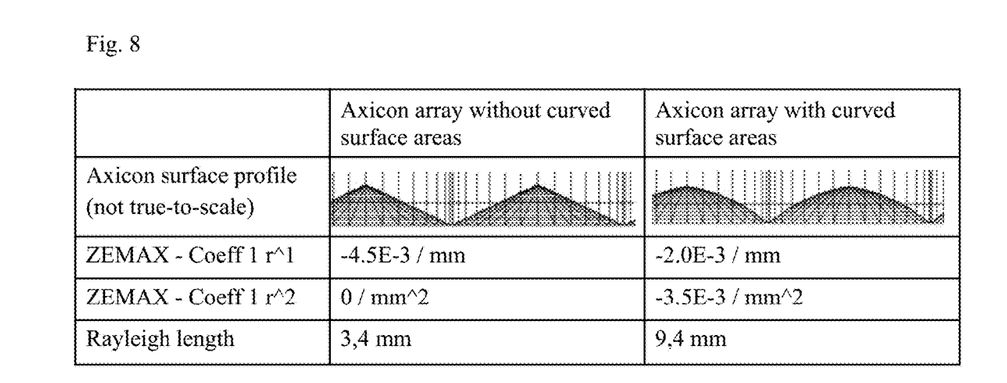
FIG. 8 shows a table for a comparison between an axicon array comprising axicon units without curved lateral surfaces and an inventive axicon array comprising axicon units with curved lateral surfaces.

The table according to FIG. 8 shows these effects in an exemplary manner based on two ZEMAX simulations. In this case, an axicon array without curved surface areas and an axicon array with curved surface areas are compared to one another. In the first line of the table, simulated surface profiles (side view) of an axicon array without curved lateral surfaces (left) and an inventive axicon array with curved lateral surfaces (right) are compared. The height profile z(r) is defined in accordance with a polynomial: $z(r)=\text{Coeff1}*r+\text{Coeff2}*r^2+\ldots$. A curved surface results if one of the higher coefficients Coeff2, ... is not equal to 0. Due to the curved surface areas, the Rayleigh length can be increased from 3.4 mm to 9.4 mm.

Figure 6A:
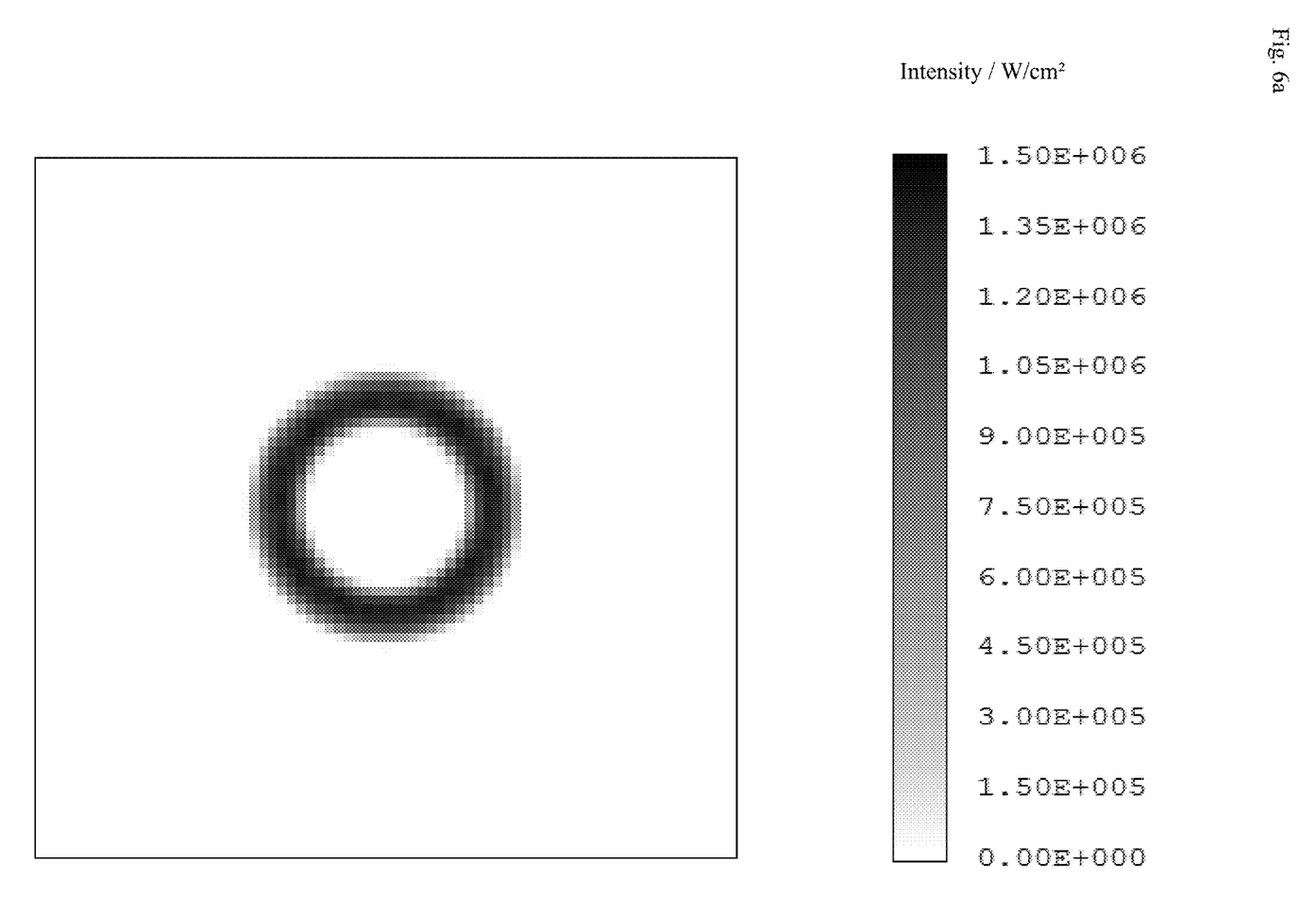
FIG. 6a shows a simulated beam profile of an axicon array comprising axicon units without curved lateral surfaces in the focal plane.
Figure 6B:
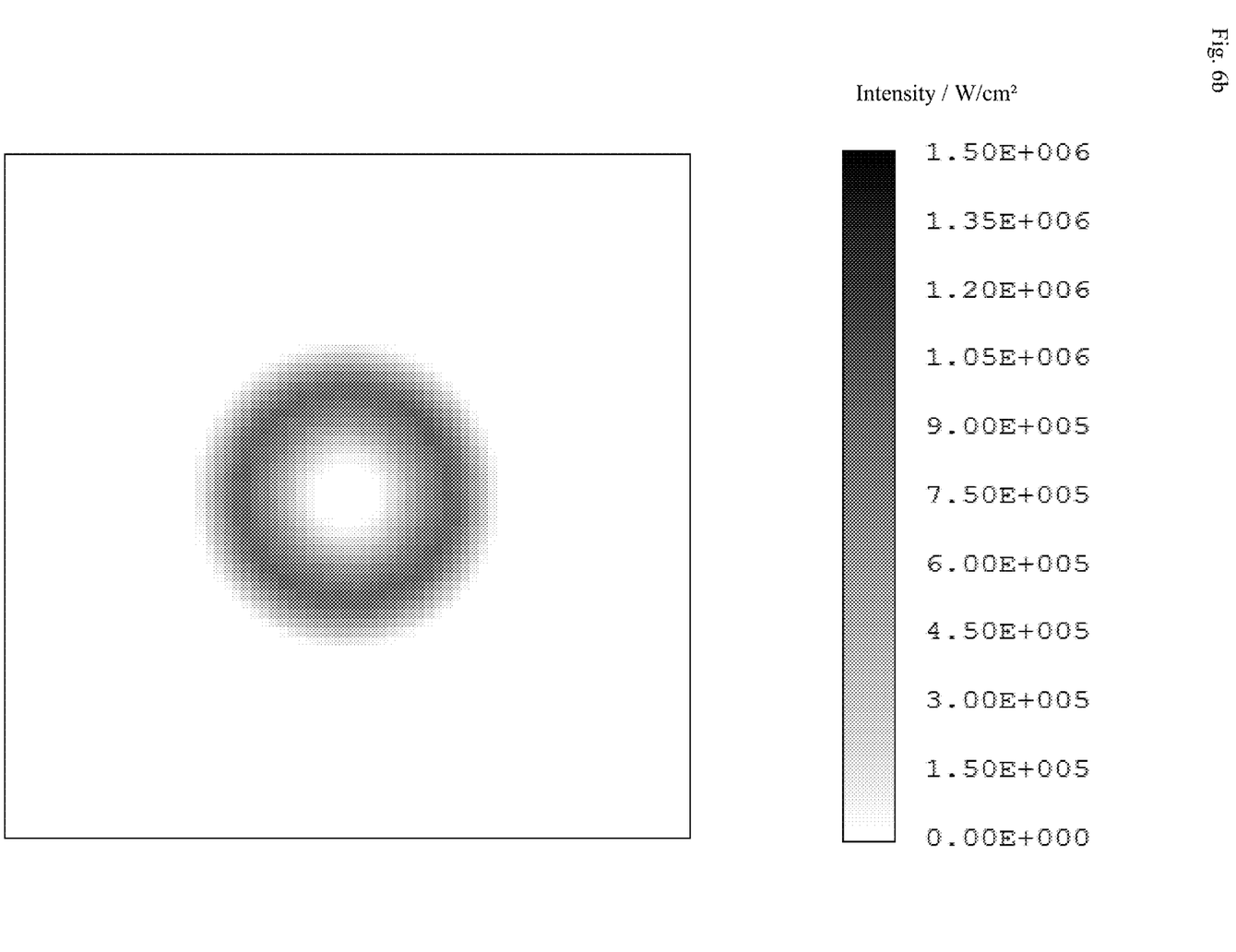
FIG. 6b shows a simulated beam profile of an inventive axicon array comprising axicon units with curved lateral surfaces in the focal plane.
Figure 6C:
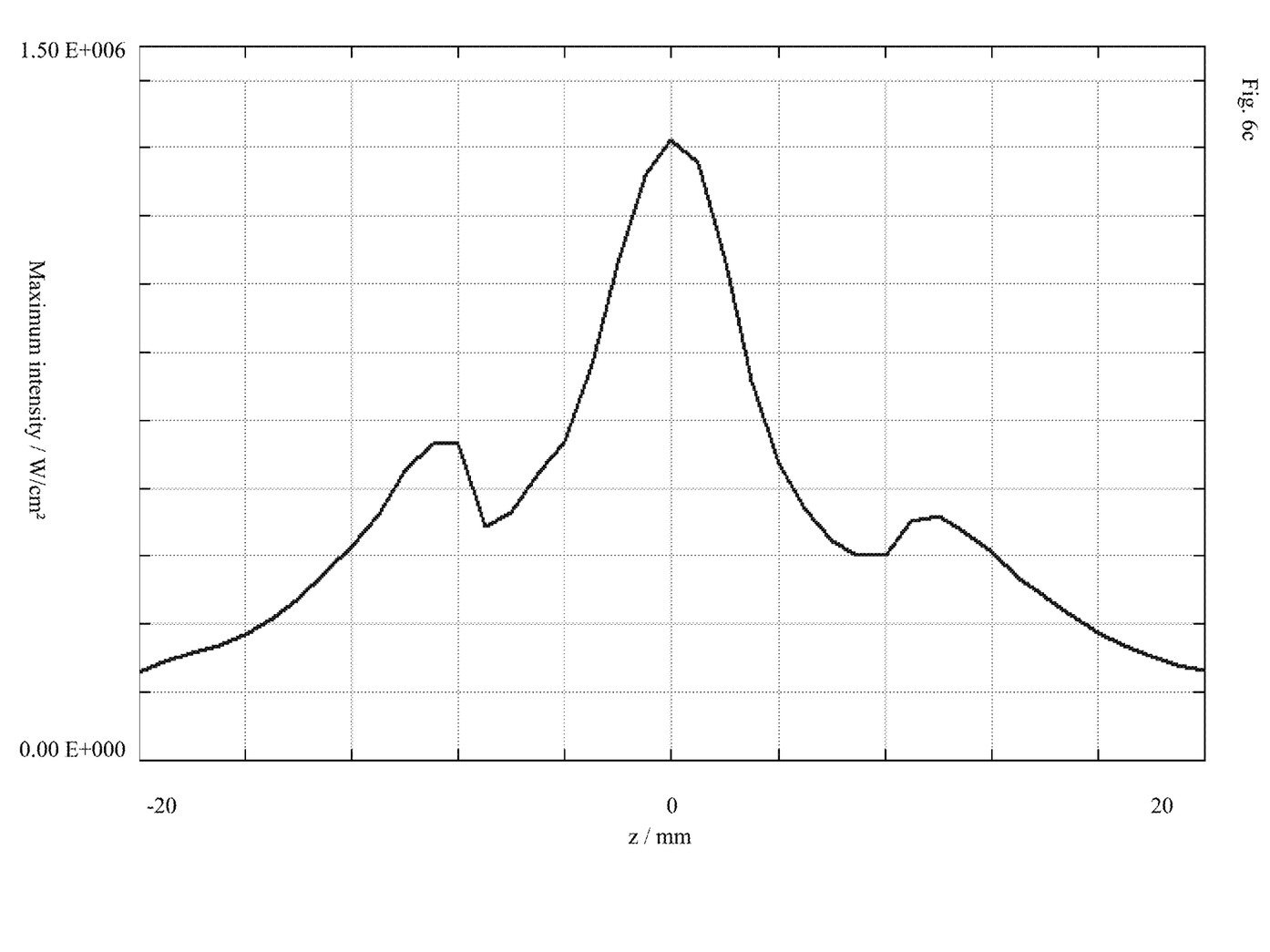
FIG. 6c shows a simulated distribution of the maximum intensity as a function of the z-position for an axicon array comprising axicon units without curved lateral surfaces.
Figure 6D:
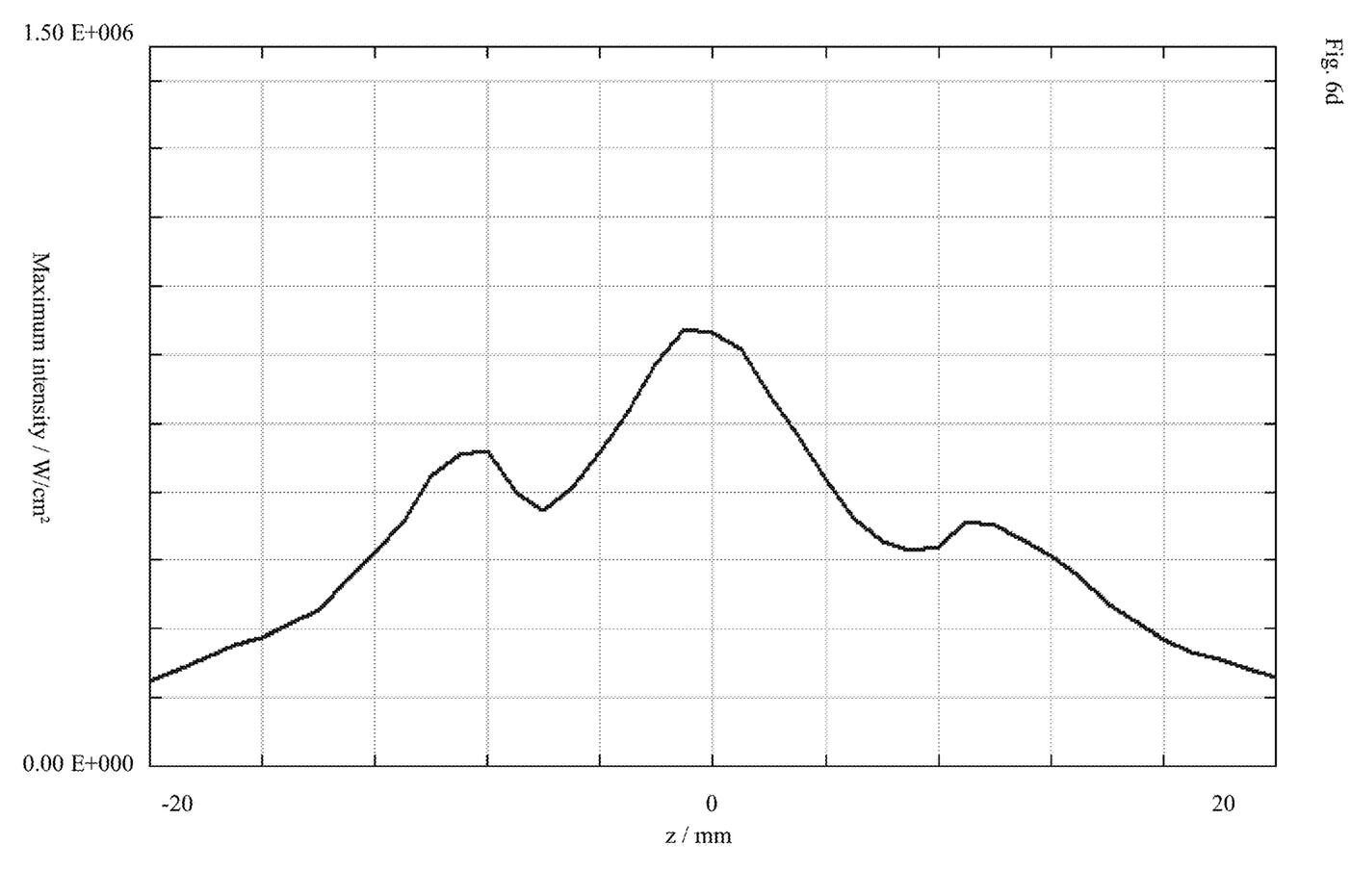
FIG. 6d shows a simulated distribution of the maximum intensity as a function of the z-position for an axicon array comprising axicon units with curved lateral surfaces.

FIGS. 6a and 6b respectively show the corresponding simulated beam profiles in the focal plane z=0 for the axicon array without curved lateral surfaces and the inventive axicon array with curved lateral surfaces. The maximum intensity as a function of the z-position (along the optical axis) is illustrated for the axicon array without curved lateral surfaces in FIG. 6c and for the inventive axicon array with curved lateral surfaces in FIG. 6d. According to FIGS. 6a to 6d, the beam profile in the focal plane is more homogenous for the axicon array comprising microaxicons with curved lateral surfaces and the maximum intensity is more uniformly distributed in the z-direction.

Figure 7:
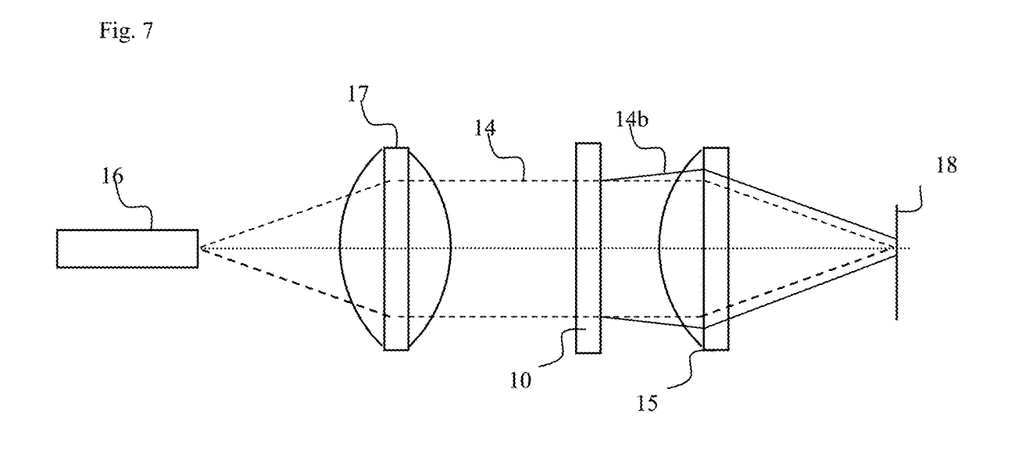

FIG. 7 shows a beam forming lens system with the axicon array 10 in the beam path of an apparatus for machining material using a laser beam, for example a laser machining head, particularly for laser cutting processes. In this exemplary arrangement, the beam forming lens system or the axicon array 10 is respectively arranged in the collimated laser beam 14 between a collimator lens system 17 and a focusing lens system 15. The collimator lens system 17 transforms a divergent laser beam emitted by an optical fiber 16 into a parallel or collimated laser beam 14, which is focused on a workpiece 18 by the focusing lens system 15. Alternatively, the beam forming lens system or the axicon array 10 may be respectively arranged downstream of the focusing lens 15. The beam forming lens system or the axicon array 10 may generally also be arranged in the divergent or convergent laser beam.

The beam forming lens system with the axicon array 10 can be combined with arbitrary lens systems. In a combination with one or more lenses that have a variable focal length, the created ring diameter of the intensity profile can be varied in the focal plane and therefore individually adapted to the material and material thickness. It is therefore possible to machine thick and thin metal sheets with a laser machining head that comprises the beam forming lens system with the axicon array 10 and a lens system with variable focal length. The focal length can be varied, for example, by displacing individual or multiple lenses along the optical axis (z-displacement). Alternatively, lenses with variable focal length such as liquid lenses or polymer lenses may be used.

The beam forming lens system or the axicon array 10 preferably can be inserted into and removed from the apparatus or the laser machining head. This means that the beam forming lens system or the axicon array 10 is movably mounted in the apparatus or the laser machining head, preferably in a collimated portion of the beam path or alternatively in a divergent or convergent portion of the beam path. In this way, the ring formation of the intensity profile in the focal plane can be selectively switched on and off. For a permanent ring formation, the beam forming lens system or the axicon array 10 naturally can also be permanently installed into the beam path.

Due to the curvature of the microaxicon surfaces, the inventive axicon array makes it possible to increase the attainable Rayleigh length of a laser beam such that the ring thickness in the focal plane is increased and the peak intensity is lowered. This allows a homogenous annular intensity distribution on a workpiece and a more homogenous temperature distribution resulting therefrom. When using lenses with variable focal length, a diameter of the annular focal point can also be varied and adapted to the respective workpiece. In this way, a laser machining head with the inventive axicon array can be used in a versatile manner.

The invention claimed is:

1. An apparatus for machining material using a laser beam, comprising:
   a machining head configured to emit a machining laser beam;
   a beam forming lens system having a two-dimensional axicon array with a plurality of microaxicons for creating an annular intensity profile of the machining laser beam, wherein each of the microaxicons have a curved surface area to form a dome-like shape, wherein a corresponding partial beam of the machining laser beam passes through each of the microaxicons; and
   a focusing lens system configured to receive and focus the machining laser beam onto a workpiece by superimposing partial beams of the machining laser beam, wherein the beam forming lens system is configured to form a homogenized annular intensity profile of the machining laser beam in a focal plane of the focusing lens system.

2. The apparatus of claim 1, wherein the surface areas of at least a few microaxicons are curved aspherically.

3. The apparatus of claim 1, wherein apices of at least a subset of valleys of the microaxicons between at least the subset of microaxicons are rounded.

4. The apparatus of claim 1, wherein the microaxicons are arranged in a hexagonal pattern.

5. The apparatus of claim 1, wherein the microaxicons are arranged in a regular grid structure.

6. The apparatus of claim 1, wherein the two-dimensional axicon array comprises conical microaxicons.

7. The apparatus of claim 1, wherein at least a subset of the microaxicons have a circular circumference.

8. The apparatus of claim 1, wherein at least a subset of the microaxicons have a cross section in the form of an isosceles triangle.

9. The apparatus of claim 1, further comprising:
   a collimator lens system configure to widen the machining laser beam, wherein the beam forming lens system is arranged in a path of the machining laser beam downstream of the collimator lens system.

10. The apparatus of claim 1, further comprising:
    at least one lens with variable focal length that vary a ring diameter of the intensity profile in the focal plane.

11. The apparatus of claim 1, wherein the beam forming lens system is selectively inserted into the beam path of the apparatus.

12. The apparatus of claim 1, wherein at least two of the microaxicons are shaped differently.

\* \* \* \* \*